Sept. 6, 1966  S. SALOWE ETAL  3,271,655
APPARATUS FOR GENERATING A PLURALITY OF PHASE DISPLACED
PERIODIC ELECTRICAL QUANTITIES
Filed March 8, 1962  2 Sheets-Sheet 1

WITNESSES
John F. Healy Jr.
James F. Young

INVENTORS
Seymour Salowe &
Warren J. Schmidt
BY John L. Houghton
ATTORNEY

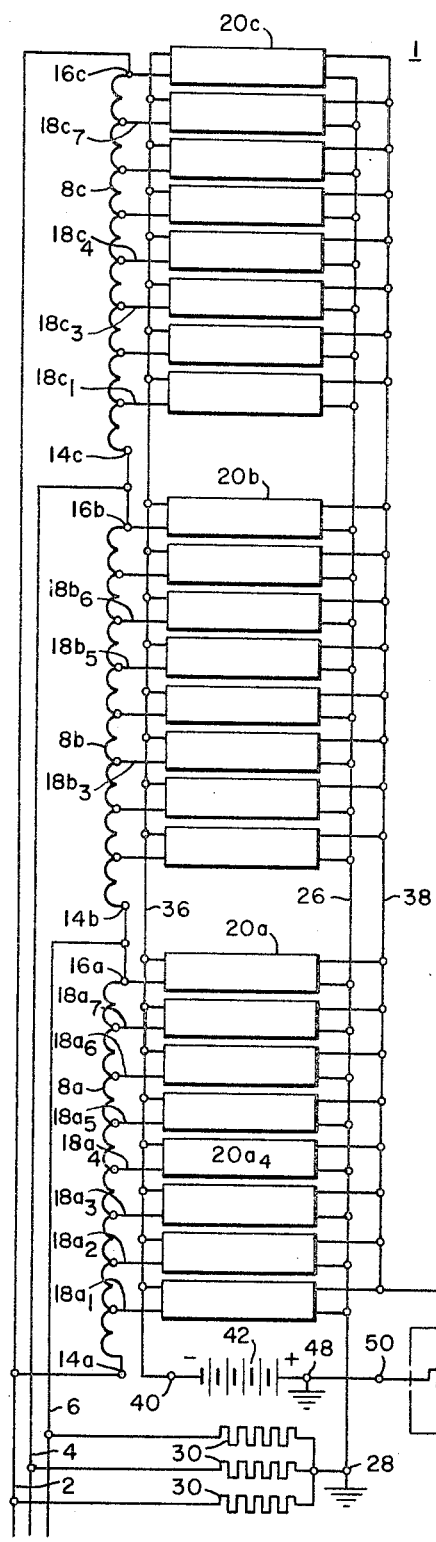
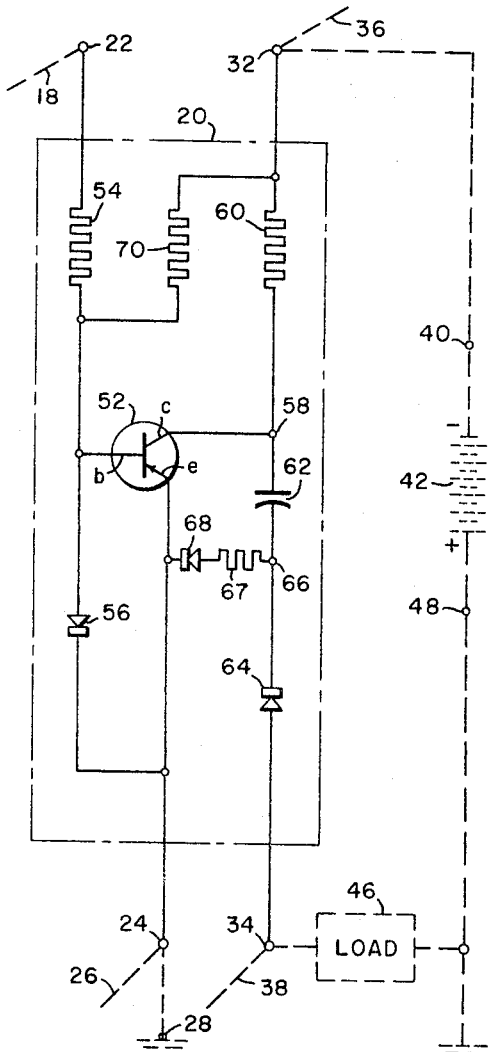
Fig. 3
Fig. 2

3,271,655
APPARATUS FOR GENERATING A PLURALITY OF PHASE DISPLACED PERIODIC ELECTRICAL QUANTITIES
Seymour Salowe, West Caldwell, and Warren J. Schmidt, Upper Montclair, N.J., assignors to Westinghouse Electric Corporation, East Pittsburgh, Pa., a corporation of Pennsylvania
Filed Mar. 8, 1962, Ser. No. 178,324
20 Claims. (Cl. 321—7)

This invention relates generally to alternating current networks and more particularly to such a network which will provide a plurality of phase displaced periodic electrical quantities having a frequency determined by the frequency of the alternating current supply from which the network is energized.

An object of this invention is to provide a new and improved circuit for providing an increased output frequency which is synchronized with and bears a predetermined fixed ratio to the input frequency.

A further object of this invention is to provide such a network in which no moving parts are used and all of the elements are of the static type.

Other objects of the invention will be apparent from the specification, the appended claims and the drawings, in which drawings:

FIG. 2 is a block diagram showing the invention as applied to a three phase supply circuit;

FIG. 3 is a schematic diagram showing the circuit of the networks shown in block form in FIG. 2;

Figure 1:
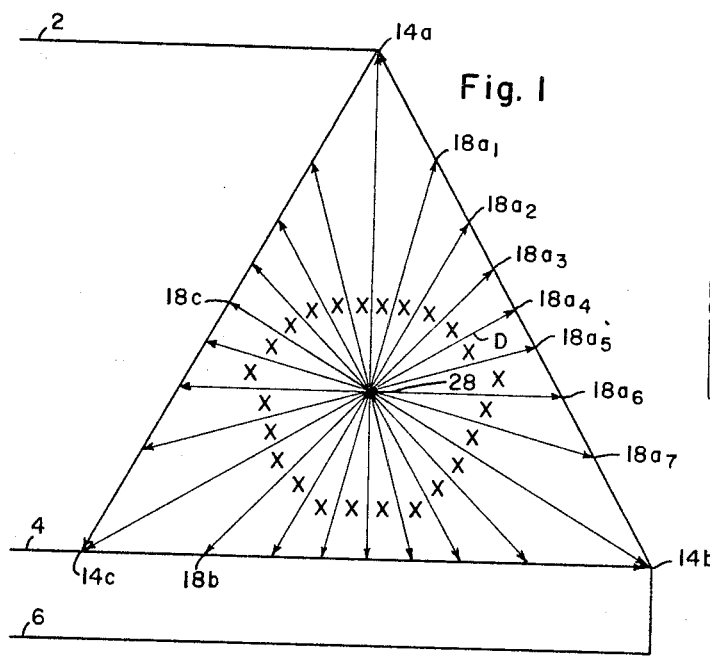
FIGURE 1 is a vector diagram illustrating the theory of a presently preferred form of the invention.

Referring to the drawings by characters of reference, the numeral 1 indicates a pulse producing network which is controlled from potential supplying conductors or lines 2, 4 and 6 of a three phase source, not shown, to provide pulses at an increased frequency relative to the frequency of the potential of the lines 2, 4 and 6. A plurality of reactors 8a, 8b and 8c (FIG. 2) are connected in delta across the three phase supply conductors 2, 4 and 6. The reactors 8a, 8b and 8c are identical. When referring to the reactors generally they will be referred to without the addition of the subscript. When a specific reactor is referred to the subscript will be used. Each of the reactors 8 are provided with end terminals or taps 14 and 16 and intermediate terminals or taps 18.

A plurality of control networks or relay switching devices 20a, 20b and 20c are connected to be energized from the taps 16 and 18 of the reactors 8a, 8b and 8c respectively. These networks 20a, 20b and 20c are identical. When they are referred to generally the reference characters without the subscripts will be used. When a specific network is referred to the proper subscript will be added. The networks 20 are provided with control terminals 22 and 24. The terminals 22 are connected to the taps 16 and 18 and the taps 24 are connected through a common bus 26 to a neutral point 28 which may be grounded if desired. The neutral point 28 is obtained in any usual manner as for example, by the star connected resistors 30 which are connected between the neutral point 28 and the supply conductors 2, 4 and 6. The networks 20 are provided with output circuit terminals 32 and 34. The terminals 32 are connected to the bus 36 and the terminals 34 are connected to the bus 38. The bus 36 is connected to the negative terminal 40 of a suitable direct potential source 42. The bus 38 is connected to one terminal 44 of a load 46. The other terminal 50 of the load is connected to the positive terminal 48 of the source 42 which may be grounded if desired. As illustrated, the load may contain resistance R, inductance L, and capacity C in any relative proportion or it may omit one or more of the elements R, L and C.

As indicated more completely in FIG. 3, the network 20 comprises a transistor 52 having a collector $c$ and emitter $e$ and a base $b$. The base $b$ is connected through a resistor 54 to the terminal 22. The emitter $e$ is directly connected to the terminal 24. A rectifier 56 is connected between the base $b$ and the emitter $e$ in a direction to shunt reverse current through the control circuit and thereby prevent any abnormal buildup of reverse bias on the control circuit of the transistor 52. The collector $c$ is connected to a common point 58 between a resistor 60 and a capacitor 62. The other terminal of the resistor 60 is connected to the terminal 32 while the other terminal of the capacitor 62 is connected through a rectifier 64 to the terminal 34. The rectifier 64 is polarized as illustrated in FIG. 3 to permit charging current for the capacitor 62 to flow from the input terminal 34 through the rectifier 64 and resistor 60 to the terminal 32. The terminal 66 which is common to the rectifier 64 and the capacitor 62 is connected through a resistor 67 and a suitable current controlling device such as a rectifier 68 to the emitter $e$ of the transistor 52. A resistor 70 is connected between the terminal 32 and the base $b$ of the transistor 52.

When the transistor 52 conducts, it discharges the capacitor 62. When the transistor 52 is blocked, charging current is supplied from the source 42 to the capacitor 62 and energizes the load 46. When either no voltage or a positive voltage is applied between the control terminals 22 and 24 (terminal 22 is positive with respect to terminal 24), the transistor 52 will be maintained in a minimum conducting or blocked condition and charging current for the capacitor 62 will flow through the load 46. When a negative voltage appears between the terminals 22 and 24 (terminal 22 is negative with respect to terminal 24), the transistor 52 conducts to discharge the capacitor 62.

The taps 18 are so arranged that the phase angles $x$ between the voltages which appear between any two adjacent taps 18 and the neutral connection 28 are the same angle. This is best illustrated in FIG. 1. It is appreciated that the magnitude of the voltages, as will be apparent by the varying vector lengths, is not constant but this variation in magnitude is not important because this potential is used as a control potential to trigger the transistors 52 which operate in their switching mode and the operation of the transistors 52 is based merely upon the phase relationship of these potentials.

The energization of the load 46 results from the flow of charging current to the capacitor 62 which, due to the equal phase angles $x$, occurs in a predetermined sequence to provide pulses 71 at a frequency which is a function of the number of taps 18. In the illustrated embodiment, the reactors 8 each contain 7 intermediate and 2 end taps and are connected in delta across the three phase supply conductors 2, 4 and 6. This arrangement provides an output frequency which is twenty-four times that of the three phase supply since for each input cycle of the supply each of the twenty-four networks will be pulsed once.

Figure 5:
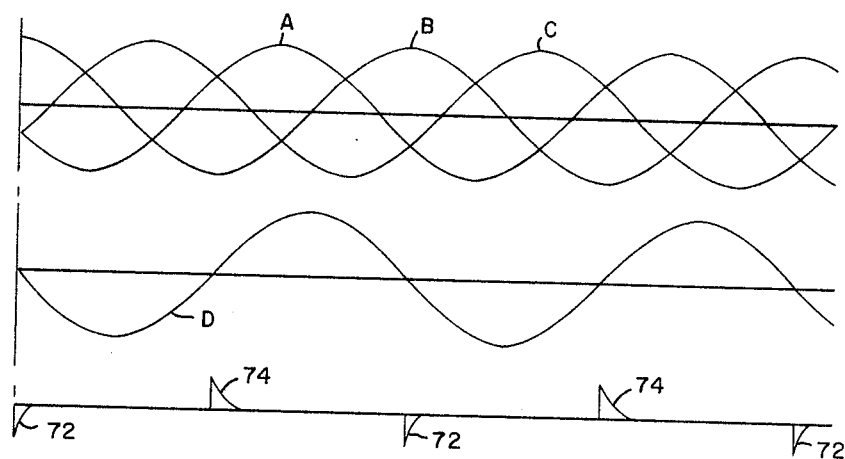
FIG. 5 is a view showing certain of the voltage relationships of the invention.

FIG. 5 illustrates roughly the output voltage relationship in the apparatus. Curves A, B and C represent the three phase input potential supplied by conductors 2, 4 and 6 to the delta connected reactors 8. The curve D represents the voltage which appears between the neutral terminal 28 and the midpoint tap $18a_4$ of the reactor 8a and, as vectorially shown in FIG. 1, lags the phase voltage A by 90 electrical degrees. The curve D, except for its phase angle and magnitude, is illustrative of all of the voltages between the taps 14 and 18 and terminal 28. As the voltage D appearing at the center tap $18a_4$ changes from a negative potential with respect to terminal 28 to a positive potential, the transistor 52 of the network $20a_4$ associated with this tap $18a_4$ becomes nonconductive. This opens the discharge circuit of the capacitor 62 of this network and this capacitor commences to charge through the load 46 to energize the load 46 with a voltage pulse illustrated as the pulse 72 which, for the purposes of simplification, is illustrated as being in phase with the capacitor charging current. The time constant of this pulse must not exceed the time interval equal to the phase angle $x$ between the voltage vectors. The rectifiers 64 prevent flow of current from the capacitor 62 of one network 20 to any other capacitor 62.

At the time when the potential of the center tap $18a_4$ becomes negative with respect to the neutral terminal 28, the associated transistor 52 again conducts to discharge the associated capacitor 62 through the current limiting resistor 67 and rectifier 68. This discharge is illustrated in FIG. 5 by the curve 74. The discharge period of the capacitor may be much longer than the charging period and can be as long as one half cycle of the potential supplied by the conductors 2, 4 and 6.

The number of turns on the reactors 8 between the various taps will vary to provide equal phase angles $x$ as will be apparent from the vector diagram (FIG. 1). The required turns may be easily calculated for a balanced 3 phase line voltage by the formula:

$$T = \frac{1}{\sqrt{3}} \cdot \frac{\sin\left(n\frac{120}{N}\right)}{\sin\left(150 - n\frac{120}{N}\right)}$$

where T is the total number of turns from the terminal 14 to the terminals 18, $18_2$, $18_3$, etc., as the case may be, $n$ is the number of the tap $18_1$, $18_2$, $18_3$, etc. from the tap 14, and N is the number of all taps 18 less 1. In this instance, N equals 8. This formula may be easily derived by means of trigonometry using the well known equation for the solution of oblique triangles in which any two angles and any side are given. In this instance, the triangle side represented by the vector extending from terminal 28 to the tap $14a$ is of a length equal to 1 divided by the square root of 3 times the total number of turns of the reactor 8.

Figure 4:
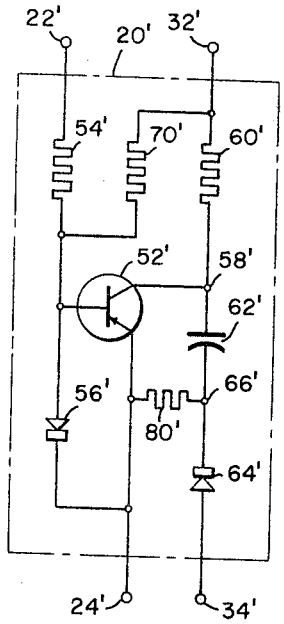
FIG. 4 is a schematic diagram of a modified form of network illustrated in FIG. 3.

In FIG. 4 there is shown a modified form of the network 20 designated 20' and in which like parts to the network 20 are identified by the same numerals with a prime added. The network 20' distinguishes from the network 20 in that the diode 68 and current limiting resistor 67 of the network 20 have been replaced by a resistor 80' which is of a value greater than that of the impedance of the load 46 which is associated with the network 20' and yet sufficiently low so that the capacitor 62' can discharge through it and the transistor 52' during an interval which is not greater than one-half cycle of the input voltage supplied from the conductors 2, 4 and 6. In many instances the network 20' will be used in place of the network 20 since resistors are cheaper than diodes. As long as the magnitude of the resistor is properly proportioned with respect to the magnitude of the load impedance, the operation will be satisfactory for most instances.

While it is believed that the operation of the network 1 will be apparent from the foregoing, it will be herein pointed out that the various transistors 52 and 52' of the networks 20 or 20' which are connected as indicated in FIG. 2 will be sequentially pulsed in accordance with the vector diagram as shown in FIG. 1. As shown in FIG. 3, a substantially sine wave of voltage will be applied between the terminals 22 and 24 or 22' and 24', as the case may be. During the positive one-half cycle of the control voltage excursion, the transistor 52 or 52' will be maintained non-conducting whereby the capacitor 62 may become charged to provide an output pulse 71. Substantially one-half cycle later (as measured by the supply potential), the transistor 52 or 52' will be rendered conductive and the capacitor 62 or 62' will discharge at a rate such that it will be completely or substantially completely discharged before the transistor again becomes conductive.

During the blocked period of the transistor current flows from the potential source 42 through the load 46 to charge the capacitor 62 at a rate determined by the total magnitude of the impedance of the load 46 and the impedance of the resistor 60. Immediately upon blocking of the transistor 52 or 52', the potential of the terminal 66 will be intermediate the potential of the terminal 48 and the terminal 40 as determined by the relative magnitudes of the impedances of the load 46 and resistor 60. As the capacitor 62 charges, the charging current through the load 46 and capacitor 60 will decrease and the potential of the terminal 66 will approach that of the positive terminal 48 of the battery. This negative excursion of the potential of the terminal 66 should be substantially complete prior to the time that the succeeding one of the networks 20 or 20' is actuated to cause the transistor therein to become blocked.

Once the capacitor 62 or 62' has become charged and the potential of the terminal 66 or 66' has reached the potential of the terminal 48 of the battery 42, it remains at this potential as long as the transistor 52 remains blocked. When, however, the input potential supplied between the control terminals 22 and 24 or 22' and 24' reverses in polarity, to become negative, the transistor 52 is pulsed into a conducting condition to discharge the capacitor 62 or 62' through the diode 68 and transistor 52 or resistor 80' and transistor 52' as the case may be. At this time the potential of the terminal 66 or 66' will become positive with respect to ground as indicated at 74. The diodes 64 and 64' prevents this positive excursion of the potential of the terminal from being reflected to the common control bus 38. As indicated above, the time of this positive excursion of the potential of the terminal 66 or 66' must not exceed a half cycle of the voltage applied between the conductors 2, 4 and 6.

The invention has been described and illustrated in connection with a three phase power source because the three phase source is the one which is usually commercially available. It will be apparent, however, that sources having a different number of phases may be used. The simplest way is to connect the supply in mesh by transformers or other impedance devices, provide a neutral as above described, and then provide taps on the various transformer windings or impedance devices by applying trigonometry to the resulting vector diagram in the same general way as described in connection with the three phase embodiment.

Additionally it is not necessary that the frequency increase be an integral ratio of the number of source phases as is illustrated in FIG. 1. If an integral ratio is used all of the transformers or impedance devices will be the same. If the ratio is not an integral number the taps on each phase device will be different, but may be ascertained by applying trigonometric equations. If the increased frequency is not to consist of equally displaced phases, then of course the angles $x$ will vary as desired and the taps will be made accordingly.

While only a limited number of embodiments of the invention have been disclosed in accordance with the requirement of the United States patent statutes, numerous modifications are possible and it is desired to cover all modifications falling within the spirit and scope of the invention.

What is claimed and is desired to be secured by United States Letters Patent is as follows:

1. In a network for generating periodic electrical quantities, a source of polyphase alternating potential of a first frequency, a plurality of inductors, each said inductor having end taps and at least one intermediate tap, means individually connecting said end taps of said inductors in mesh configuration across the phases of said source, a plurality of impedance devices, means connecting said devices in star connection across the phases of said source to provide a neutral connection, a pair of input terminals, a pair of output terminals, circuit means connecting said input terminals and said output terminals, and including a switching means regulating the flow of energy through said circuit means as a function of the polarity of the potential applied thereto, said switching means including a control means for controlling the initiation of current flow therethrough, said control means being connected between said neutral connection and each of said taps for actuating said switching means at a desired phase angle of the voltage between said neutral connection and each of said taps to provide a sequence of pulses at said output terminals.

2. In a frequency multiplying network, a source of polyphase alternating potential, a plurality of inductors, each said inductor having end taps and at least one intermediate tap, means individually connecting said end taps of said inductors in mesh configuration across the phases of said source, a plurality of impedance devices, means connecting said devices in star connection across the phases of said source and providing a neutral connection, and means connected between said neutral connection and each of said taps for energizing said output terminals at a desired phase angle of the potential between each of said taps and said neutral connection, said taps being spaced relative to each other such that the phase of the potential between said neutral connection and any two adjacent said taps is equal to 360 degrees divided by the total number of said intermediate taps plus one-half the total number of said end taps.

3. In a network of the character described, three inductors, each said inductor having first and second end taps and a plurality of intermediate taps, three impedances, each said impedance having first and second end terminals, a neutral terminal, means connecting each of said first end terminals of said impedances to said neutral terminal, means connecting said first end taps of said inductors to said second end taps of other of said inductors thereby to connect said inductors in delta, means individually connecting said second end terminals of said impedances to said second end taps of said inductors, output means, switch actuating means controlling the energization of said output means as a function of the polarity of the potential applied thereto, and means connecting said switch actuating means between said neutral terminal and each of said taps for energization of said output means as a function of the change in the polarity of the potentials between said neutral terminal and each of said inductor taps, each of said taps except said first inductor tap of each said inductor being spaced from its said first inductor tap in accordance with the formula:

$$T = \frac{1}{\sqrt{3}} \cdot \frac{\sin\left(n\frac{120}{N}\right)}{\sin\left(150 - n\frac{120}{N}\right)}$$

where T is the percent of the total turns on the said inductor, $n$ is the number of the tap counting away from the said first tap, and N is the total number less 1 of taps on the said inductor.

4. In an apparatus of the character described, a plurality of networks, each said network including an energy storage device and a valve device and a current flow controlling device and an impedance, each said valve device having a main circuit and a control circuit, each network including a charging circuit for its said storage device which includes its said impedance, each said network including a discharging circuit for its said storage device which includes its said current controlling device and said main circuit of its said valve device, a ring like voltage divider having at least three main taps equally spaced around said divider and at least one intermediate tap between each of said main taps, said main taps being arranged to be energized from a three phase source of potential, means associated with said main taps to provide a neutral connection for said source potential, said taps being arranged around said divider such that the phase angle of the potentials between said neutral connection and two adjacent ones of said taps, means individually connecting said control circuits of said networks between said neutral connection and said taps, a pair of output terminals, a source of potential, means connecting each of said charging circuits between said output terminals, each said last named means including said just-named potential source.

5. In an apparatus of the character described; a plurality of networks; each said network including a transistor having a base and an emitter and a collector, a plurality of resistors, a capacitor having terminals, and a diode; each said network having first and second control terminals and first and second circuit terminals; each said network including means connecting said emitter solely to one of said first and said second control terminals, means including a first of said resistors connecting said base to the other of said second and said first control terminals, said other control terminal being the one thereof to which the emitter is not connected, means including said diode connecting one terminal of said capacitor to said first circuit terminal, means including a second of said resistors connecting the other terminal of said capacitor to said second circuit terminal, and means connecting said collector and emitter across said capacitor terminals; a plurality of impedance devices; each said impedance device including end taps and at least one intermediate tap; means connecting said end taps together to form said impedance devices into an endless loop, said end taps being arranged to be energized from a polyphase source of potential, means energized from the potential appearing at said end taps and effective to establish a neutral connection for said polyphase potential; means connecting each of said first control terminals to said neutral connection; means individually connecting said second control terminals to individual ones of said intermediate taps and said end taps; first and second supply terminals; first and second load terminals; means connecting each of said second circuit terminals to said first supply terminal; means connecting said second supply terminal to said first load terminal; and means connecting said second load terminal to each of said first circuit terminals.

6. In an apparatus of the character described; a plurality of networks; each said network including a transistor having a base and an emitter and a collector, a plurality of resistors, a capacitor having terminals, and a diode; each said network having first and second control terminals and first and second circuit terminals; each said network including means connecting said emitter solely to one of said first and said second control terminals, means including a first of said resistors connecting said base to the other of said second and said first control terminals, said other control terminal being the one thereof to which the emitter is not connected, means including said diode connecting one terminal of said capacitor to said first circuit terminal, means including a second of said resistors connecting the other terminal of said capacitor to said second circuit terminal, and means connecting said collector and emitter across said capacitor terminals; a plurality of impedance devices; each said impedance device including end taps and at least one intermediate tap; means connecting said ends taps together to form said impedance devices into an endless loop, a source of polyphase potential connected to said end taps, means energized from the potential appearing at said end taps and establishing a neutral connection for said polyphase potential; means connecting each of said first control terminals to said neutral connection; means individually connecting said second control terminals to individual ones of said intermediate taps and said end taps; first and second supply terminals; first and second load terminals; means connecting each of said second circuit terminals to said first supply terminal; means connecting said second supply terminal to said first load terminal; and means connecting said second load terminal to each of said first circuit terminals; said taps being displaced about said loop such that the phase angle between the potential appearing across said first and second control terminals of any two adjacent said networks is equal to the phase angle between the potential appearing across said first and second control terminals of any other two adjacent said networks.

7. In an apparatus of the character described; a plurality of networks; each said network including a transistor having a base and an emitter and a collector, a plurality of resistors, a capacitor having terminals, and a diode; each said network having first and second control terminals and first and second circuit terminals; each said network including means connecting said emitter solely to one of said first and said second control terminals, means including a first of said resistors connecting said base to the other of said second and said first control terminals, said other control terminal being the one thereof to which the emitter is not connected, means including said diode connecting one terminal of said capacitor to said first circuit terminal, means including a second of said resistors connecting the other terminal of said capaciator to said second circuit terminal, and means connecting said collector and emitter across said capacitor terminals; a plurality of impedance devices, each said impedance device including end taps and at least one intermediate tap; means connecting said end taps together to form said impedance devices into an endless loop, a source of polyphase potential connected to said end taps, means energized from the potential appearing at said end taps and establishing a neutral connection for said polyphase potential; means connecting each of said first control terminals to said neutral connection; means individually connecting said second control terminals to individual ones of said intermediate taps and said end taps; first and second supply terminals; first and second load terminals; means connecting each of said second circuit terminals to said first supply terminal; means connecting said second supply terminal to said first load terminal; and means connecting said second load terminal to each of said first circuit terminals; said taps being displaced about said loop such that the phase angle between the potential appearing across said first and second control terminals of any two adjacent said networks is equal to the phase angle between the potential appearing across said first and second control terminals of any other two adjacent said networks; each said network including a current flow controlling device connected intermediate said emitter and said capacitor.

8. In an apparatus of the character described; a plurality of networks; each said network including a transistor having a base and an emitter and a collector, a plurality of resistors, a capacitor having terminals, and a diode; each said network having first and second control terminals and first and second circuit terminals; each said network including means connecting said emitter solely to one of said first and said second control terminals, means including a first of said resistors connecting said base to the other of said second and said first control terminals, said other control terminal being the one thereof to which the emitter is not connected, means including said diode connecting one terminal of said capacitor to said first circuit terminal, means including a second of said resistors connecting the other terminal of said capacitor to said second circuit terminal, and means connecting said collector and emitter across said capacitor terminals; a plurality of impedance devices, each said impedance device including end taps and at least one intermediate tap; means connecting said end taps together to form said impedance devices into an endless loop, a source of polyphase potential connected to said end taps, means energized from the potential appearing at said end taps and establishing a neutral connection for said polyphase potential; means connecting each of said first control terminals to said neutral connection; means individually connecting said second control terminal to individual ones of said intermediate taps and said end taps; first and second supply terminals; first and second load terminals; means connecting each of said second circuit terminals to said first supply terminal; means connecting said second supply terminal to said first load terminal; and means connecting said second load terminal to each of said first circuit terminals; said taps being displaced about said loop such that the phase angle between the potential appearing across said first and second control terminals of any two adjacent said networks is equal to the phase angle between the potential appearing across said first and second control terminals of any other two adjacent said networks; each said network including a current flow controlling device connected intermediate said emitter and said capacitor; a loading device connected between said load terminals and having a first impedance; said current flow controlling device having a greater impedance to current flow in a direction of current flow from said first control terminal to said capacitor than said first impedance.

9. In an apparatus of the character described; a plurality of networks; each said network including a transistor having a base and an emitter and a collector, a plurality of resistors, a capacitor having terminals, and a diode; each said network having first and second control terminals and first and second circuit terminals; each said network including means connecting said emitter solely to one of said first and said second control terminals; means including a first of said resistors connecting said base to the other of said second and said first control terminals, said other control terminal being the one thereof to which the emitter is not connected, means including said diode connecting one terminal of said capacitor to said first circuit terminal, means including a second of said resistors connecting the other terminal of said capacitor to said second circuit terminal, and means connecting said collector and emitter across said capacitor terminals; a plurality of impedance devices; each said impedance device including end taps and at least one intermediate tap; means connecting said end taps together to form said impedance devices into an endless loop, a source of polyphase alternating potential of a first frequency; means connecting said polyphase potential to said end taps; means energized from said polyphase potential and establishing a neutral connection for said polyphase potential; means connecting each of said first control terminals to said neutral connection; means individually connecting said second control terminal to individual ones of said intermediate taps and said end taps; first and second supply terminals; first and second load terminals; means connecting each of said second circuit terminals to said first supply terminal; means connecting said second supply terminal to said first load terminal; and means connecting said second load terminal to each of said first circuit terminals; said taps being displaced about said loop such that the phase angle between the potential appearing across said first and second control terminals of any two adjacent said networks is equal to the phase angle between the potential appearing across said first and second control terminals of any other two adjacent said networks; each said network including a current flow controlling device connected intermediate said emitter and said capacitor; a loading device connected between said load terminals and having a first impedance;

said current flow controlling device having a greater impedance to current flow in a direction of current flow from said first control terminal to said capacitor than said first impedance; said current flow controlling device having an impedance to current flow in a direction from said capacitor to said emitter which is of sufficiently small magnitude to permit discharging of said capacitor in less than one half of the length of the cycle of said first frequency.

10. A controlling network for energizing a load device with pulses of one polarity from a source of unidirectional potential having first and second taps comprising an electric valve having a main current path and a control circuit, a capacitor, a diode, and a plurality of terminals, means connecting a first and a second of said terminals and including in series said diode and said capacitor, means connecting said load device intermediate said first terminal and said first tap, means connecting said main current path in shunt with said capacitor and in shunt with said series connected load and diode and capacitor, and means connecting said control circuit between a third and a fourth said terminals.

11. A controlling network of the character described comprising a source of unidirectional potential having first and second taps, a load device, an electric valve having a pair of main electrodes and a control electrode, a capacitor, a plurality of impedance devices, a diode, a plurality of terminals, means connecting a first and a second of said terminals and including in series and in the order set forth said diode and said capacitor and a first of said impedance devices, means connecting a first of said main electrodes to the common junctions between said capacitor and said first impedance device, means connecting the second of said electrodes to the common junction between said capacitor and said diode and to said first tap, means connecting said control electrode to a third of said terminals and including a second of said impedance devices, means connecting said load device between said first tap and said first terminal, means connecting a third of said impedance devices between said control electrode and said second terminal, and means connecting said second tap to said second terminal.

12. A controlling network of the character described comprising a source of unidirectional potential having first and second taps, a load device, an electric valve having a pair of main electrodes and a control electrode, a capacitor, a plurality of impedance devices, a diode, a current regulating device, and a plurality of terminals, means connecting a first and a second of said terminals and including in series and in the order set forth said diode and said capacitor and a first of said impedance devices, means connecting one of said main electrodes to the common junctions of said first impedance and said capacitor, means connecting the other of said main electrodes to the common junctions of said diode and said capacitor and including said current regulating device, means connecting said other main electrode to said first tap, means connecting said control electrode to a third of said terminals and including a second of said impedance devices, means connecting said load device between said first and tap and said first terminal, means connecting a third of said impedance devices between said control electrode and said second terminal, and means shunt connected between said control electrode and said other electrode for limiting the magnitude of potential which may exist between said control electrode and said other electrode.

13. In a network for generating periodic electrical quantities, a source of polyphase alternating potential of a first frequency, a plurality of inductors, each said inductor having end taps and at least one intermediate tap, means individually connecting said end taps of said inductors across the phases of said source, a plurality of impedance devices, means connecting said devices in star connection across the phases of said source to provide a neutral connection, a pair of power terminals, a plurality of pulse producing networks, each of said networks having a pair of control terminals and a pair of output terminals and a pulse producing energizable element connected to energize said output terminals under control of a control device having its control connections connected between its said control terminals, each of said networks further including a timing device to determine the time duration of the pulse which is produced by its said energizable element at its said output terminals, each of said control devices being effective to energize its associated said energizable element in response to the application of a critical control voltage to its control terminals, means individually connecting said input terminals between said neutral connection and individual ones of said taps, the said predetermined time period of said networks being no greater than the time interval between the times that any two successive taps reach said predetermined voltage magnitude with respect to said neutral connection, and circuit means connecting each of said output terminals to said power supplying terminals whereby the potential between said power supplying terminals will periodically increase and decrease at a frequency equal to the number of said networks multiplied by the frequency of said polyphase potential.

14. In a network for generating periodic electrical quantities, a polyphase source of alternating potential of a first frequency, a plurality of impedance devices, each said device having end taps, means connecting said taps of a first set of said impedance devices in delta to said source, means connecting said taps of a second set of said impedance devices in Y to said source, at least one of said sets of devices having intermediate taps, a pair of power terminals, a plurality of pulse producing networks, each of said networks having a pair of control terminals and pair of output terminals and a pulse producing energizable element connected to energize said output terminals under control of a control device having its control connections connected between its said control terminals, each of said networks further including a timing device to determine the time duration of the pulse which is produced by its said energizable element at its said output terminals, each of said control devices being effective to energize its associated said energizable element in response to the application of an electrical signal to its said control terminals of a predetermined minimum critical magnitude and duration, timing device rendering said pulse of a duration independent of the time interval that said signal exceeds said minimum critical duration, means connecting said pairs of control terminals between sets of said taps, said sets of taps being chosen so as to provide a different phase angle of the voltage between any two of said sets, said timing device being set to render the time interval of said pulse less than the time interval between the times that any two successive said sets supply said minimum critical magnitude of said signal to the respective said pairs of input terminals which are connected thereto, and circuit means connecting each of said output terminals to said power terminals whereby pulses will be supplied at said power terminals at a frequency greater than the frequency of said polyphase potential.

15. In a network for generating periodic electrical quantities, a polyphase source of alternating potential of a first frequency, a plurality of impedance devices, each said device having end taps, means connecting said taps of a first set of said impedance devices in delta to said source, means connecting said taps of a second set of said impedance devices in Y to said source, at least one of said sets of devices having intermediate taps, a source of unidirectional potential, a pair of power terminals, a plurality of networks, each said network having control terminals and output terminals, means connecting said unidirectional potential source to said power terminals and including said output terminals of said networks, each said network including switch means for initiating a flow of current from said unidirectional potential source to said power terminals through its said output terminals in response to the application of a critical potential to its said control terminals, each said network further including means reducing the magnitude of said current flow through its said output terminals at the end of a predetermined pulse period irrespective of the length of time that said critical potential is applied to its said control terminals, means connecting said control terminals between pairs of taps, one tap of each of said pair of taps being a said tap of said first set of said taps and the other tap of each of said pair of taps being a said tap of said second set, each said pair of taps being chosen relative to each of the other of said pair of taps so as to provide a different phase angle of the potential of each said pair of taps, the period established by said pulse period controlling means being less than the time interval between the time that said critical potential is applied to said control terminals of any two successively operated said networks.

16. The combination of claim 15 in which said one set of devices is said first set, a first tap of each of said second set of impedance device taps is the neutral voltage point of said second set of impedance devices, and siad means which reduces the magnitude of said current flow is an energy storage device.

17. The combination of claim 16 in which each said network includes a first impedance element connected in series with its said storage device and a switch series connected with a second impedance element connected in shunt with its said storage device, said switch of each said network being rendered nonconductive by the application of said critical potential to its said control terminals whereby its said storage device will store energy and reduce the magnitude of the current flowing through its said output terminals.

18. A controlling network for energizing a load device with pulses of one polarity from a source of unidirectional potential having first and second taps comprising an electric valve having a main current path and a control circuit, a capacitor, a diode, a current regulating device, and a plurality of terminals, means connecting a first and a second of said terminals and including in series said diode and said capacitor, means connecting said load device intermediate said first terminal and said first tap, means connecting said main current path in shunt with said capacitor and including said current regulating device, means connecting said main current path in shunt with said series connected load and said diode and said capacitor, and means connecting said control circuit between a third and a fourth said terminals.

19. A controlling network for energizing a load device with pulses of one polarity from a source of unidirectional potential having first and second taps comprising an electric valve having a main current path and a control circuit, a capacitor, a current regulating device, and a plurality of terminals, means connecting said capacitor between a first and a second of said terminals, means connecting said load device intermediate said first terminal and said first tap, means connecting said main current path in shunt with said capacitor and including said current regulating device, means connecting said main current path in shunt with said series connected load and said capacitor, and means connecting said control circuit between a third and a fourth said terminals.

20. A controlling network for energizing a load device with pulses of one polarity from a source of unidirectional potential having first and second taps comprising an electric valve having a main current path and a control circuit, a capacitor, first and second diodes, and a plurality of terminals, means connecting a first and a second of said terminals and including in series said first diode and said capacitor, means connecting said load device intermediate said first terminal and said first tap, means connecting said main current path in shunt with said capacitor and including said second diode, means connecting said main current path in shunt with said series connected load and said first diode and said capacitor, and means connecting said control circuit between a third and a fourth said terminals.

References Cited by the Examiner
UNITED STATES PATENTS

| | | | |
|---|---|---|---|
| 1,898,366 | 2/1933 | Lewis | 321—66 |
| 2,225,355 | 12/1940 | Schmidt | 321—66 |
| 2,555,305 | 6/1951 | Alty | 321—45 |
| 3,118,105 | 1/1964 | Relation et al. | 321—45 |
| 3,170,107 | 2/1965 | Jessee | 321—69 |

JOHN F. COUCH, *Primary Examiner.*

LLOYD McCOLLUM, *Examiner.*

G. J. BUDOCK, G. GOLDBERG, *Assistant Examiners.*